United States Patent
Oishi et al.

(10) Patent No.: US 12,173,789 B2
(45) Date of Patent: Dec. 24, 2024

(54) HYDRAULIC CONTROL DEVICE FOR HYDRAULIC ACTUATION MACHINE, HYDRAULIC CONTROL METHOD FOR HYDRAULIC ACTUATION MACHINE, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Yuji Oishi, Sagamihara (JP); Keisuke Iwado, Ebina (JP); Hiroyuki Tokoi, Isehara (JP); Masanori Satou, Tachikawa (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/259,357

(22) PCT Filed: Nov. 26, 2021

(86) PCT No.: PCT/JP2021/043380
§ 371 (c)(1),
(2) Date: Jun. 26, 2023

(87) PCT Pub. No.: WO2022/153687
PCT Pub. Date: Jul. 21, 2022

(65) Prior Publication Data
US 2024/0052857 A1    Feb. 15, 2024

(30) Foreign Application Priority Data

Jan. 14, 2021  (JP) ................................ 2021-003952

(51) Int. Cl.
*F16H 61/00*    (2006.01)

(52) U.S. Cl.
CPC ... *F16H 61/0031* (2013.01); *F16H 2061/004* (2013.01)

(58) Field of Classification Search
CPC ... F16H 61/0031; F16H 2061/004; F15B 7/10
See application file for complete search history.

(56) References Cited

U.S. PATENT DOCUMENTS

| 2011/0224879 A1 | 9/2011 | Waku et al. | |
| 2015/0113971 A1* | 4/2015 | Morita | F15B 11/17 60/426 |

FOREIGN PATENT DOCUMENTS

| JP | 2011-185378 A | 9/2011 | |
| JP | 2014-040811 A | 3/2014 | |
| JP | 2017227297 A * | 12/2017 | ............. F16H 61/00 |

* cited by examiner

*Primary Examiner* — Tisha D Lewis
(74) *Attorney, Agent, or Firm* — Foley & Lardner LLP

(57) ABSTRACT

A hydraulic control device for a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and a drive unit configured to drive the sub oil pump, wherein when an elapsed time elapsed from a time point when the sub oil pump is driven reaches a predetermined time, the hydraulic control device generates an air discharge command for discharging air accumulated in the sub oil pump and outputs the air discharge command to the drive unit, and the drive unit drives the sub oil pump to discharge the air accumulated in the sub oil pump based on the output air discharge command.

5 Claims, 4 Drawing Sheets

HYDRAULIC CONTROL DEVICE FOR HYDRAULIC ACTUATION MACHINE, HYDRAULIC CONTROL METHOD FOR HYDRAULIC ACTUATION MACHINE, AND NON-TRANSITORY COMPUTER-READABLE MEDIUM

TECHNICAL FIELD

The present invention relates to a hydraulic control device for a hydraulic actuation machine, a hydraulic control method for a hydraulic actuation machine, and a program.

BACKGROUND ART

Patent Document 1 discloses a transmission that, when an ignition switch is changed from ON to OFF, drives an electric oil pump as a sub oil pump to discharge air accumulated in the electric oil pump together with oil.

PRIOR ART DOCUMENT

Patent Document

Patent Document 1: JP 2011-185378 A

SUMMARY OF INVENTION

However, when the transmission described in Patent Literature 1 is used, the electric oil pump is driven at a time point when the ignition switch is changed from ON to OFF to discharge the air accumulated in the electric oil pump together with the oil, but the air accumulated in the electric oil pump cannot be discharged during traveling of a vehicle without using the electric oil pump. Therefore, there is a concern that responsiveness of the electric oil pump cannot be ensured when the electric oil pump is used.

The present invention has been made in view of such a problem, and an object of the present invention is to provide a hydraulic control device for a hydraulic actuation machine, a hydraulic control method for a hydraulic actuation machine, and a program that ensure responsiveness of a sub oil pump during use.

According to one aspect of the present invention, a hydraulic control device for a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and a drive unit configured to drive the sub oil pump, wherein when an elapsed time elapsed from a time point when the sub oil pump is driven reaches a predetermined time, the hydraulic control device generates an air discharge command for discharging air accumulated in the sub oil pump and outputs the air discharge command to the drive unit, and the drive unit drives the sub oil pump to discharge the air accumulated in the sub oil pump based on the output air discharge command.

According to another aspect of the present invention, a hydraulic control method for a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and a drive unit configured to drive the sub oil pump, the hydraulic control method comprising: an elapsed time counting step of counting an elapsed time elapsed from a time point when the sub oil pump is driven; a command generation and outputting step of generating an air discharge command for discharging air accumulated in the sub oil pump and outputting the air discharge command to the drive unit when the counted elapsed time reaches a predetermined time; and an air discharge step of driving the sub oil pump to discharge the air accumulated in the sub oil pump by the drive unit based on the output air discharge command.

According to another aspect of the present invention, a program for causing a computer, which controls a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and a drive unit configured to drive the sub oil pump, to execute: an elapsed time counting procedure of counting an elapsed time elapsed from a time point when the sub oil pump is driven; a command generation and outputting procedure of generating an air discharge command for discharging air accumulated in the sub oil pump and outputting the air discharge command to the drive unit when the counted elapsed time reaches a predetermined time; and an air discharge procedure of driving the sub oil pump to discharge the air accumulated in the sub oil pump by the drive unit based on the output air discharge command.

According to these aspects, the responsiveness of the sub oil pump during use can be ensured.

DESCRIPTION OF EMBODIMENTS

Figure 1:
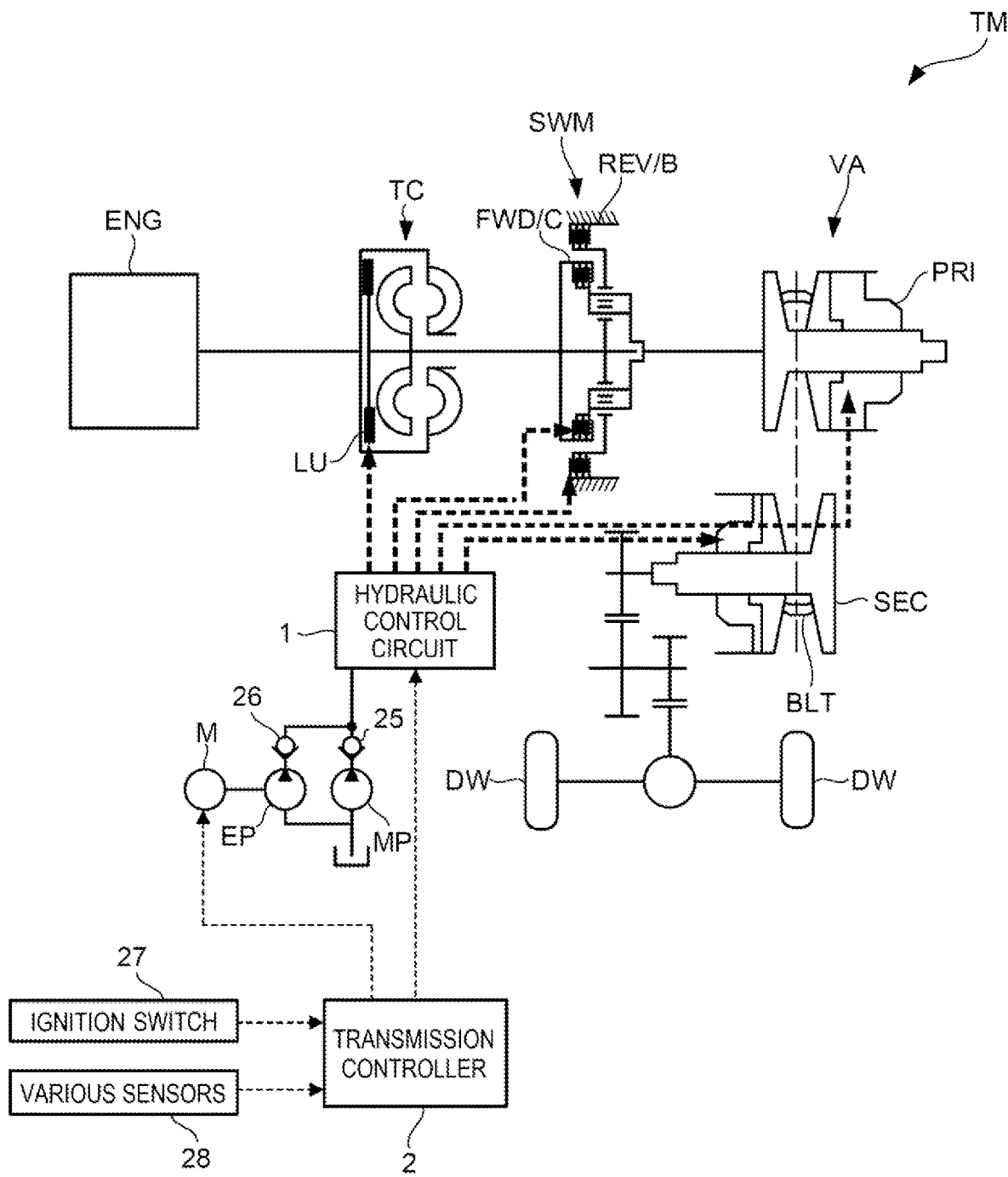
FIG. 1 is a schematic configuration diagram of a vehicle.

Hereinafter, an embodiment of the present invention (hereinafter referred to as the present embodiment) will be described with reference to the accompanying drawing.
(Configuration of Transmission)
First, a transmission TM according to the present embodiment will be described with reference to FIG. 1.
FIG. 1 is a schematic configuration diagram of a vehicle.
As shown in FIG. 1, the vehicle includes an engine ENG, a torque converter TC, a forward/reverse traveling switching mechanism SWM, and a variator VA. In the vehicle, the transmission TM as a hydraulic actuation machine is a belt continuously variable transmission including the torque converter TC, the forward/reverse traveling switching mechanism SWM, and the variator VA.

The engine ENG constitutes a drive source of the vehicle. Power from the engine ENG is transmitted to drive wheels DW via the torque converter TC, the forward/reverse traveling switching mechanism SWM, and the variator VA. In other words, the torque converter TC, the forward/reverse traveling switching mechanism SWM, and the variator VA are provided in a power transmission path connecting the engine ENG and the drive wheels DW.

The torque converter TC transmits power via a fluid. In the torque converter TC, power transmission efficiency is enhanced by engaging a lock-up clutch LU.

The forward/reverse traveling switching mechanism SWM is provided in a power transmission path connecting the engine ENG and the variator VA. The forward/reverse traveling switching mechanism SWM switches forward/reverse traveling of the vehicle by switching a rotation direction of rotation to be input. The forward/reverse traveling switching mechanism SWM includes a forward clutch FWD/C engaged when a forward range is selected and a reverse brake REV/B engaged when a reverse range is selected. When the forward clutch FWD/C and the reverse brake REV/B are released, the transmission TM enters a neutral state, that is, a power transmission interrupted state.

The variator VA constitutes a belt continuously variable transmission mechanism including a primary pulley PRI, a secondary pulley SEC, and a belt BLT wound around the primary pulley PRI and the secondary pulley SEC. A primary pulley pressure Ppri which is a hydraulic pressure of the primary pulley PRI is supplied to the primary pulley PRI from a hydraulic control circuit 1 to be described later, and a secondary pulley pressure Psec which is a hydraulic pressure of the secondary pulley SEC is supplied to the secondary pulley SEC from the hydraulic control circuit 1.

The transmission TM further includes a mechanical oil pump MP as a main oil pump, an electric oil pump EP as a sub oil pump, and an electric motor M as a drive unit.

The mechanical oil pump MP pumps (supplies) oil to the hydraulic control circuit 1. A check valve 25 is provided in a flow path that allows the mechanical oil pump MP to communicate with the hydraulic control circuit 1. The mechanical oil pump MP is driven by the power from the engine ENG.

The electric oil pump EP pumps (supplies) oil to the hydraulic control circuit 1 together with or independently of the mechanical oil pump MP. A check valve 26 is provided in a flow path that allows the electric oil pump EP to communicate with the hydraulic control circuit 1. The electric oil pump EP is provided to assist the mechanical oil pump MP. That is, when supply of oil from the mechanical oil pump MP to the transmission TM is stopped or insufficient, the electric oil pump EP temporarily supplies oil to the transmission TM based on a drive request so as to compensate for an oil shortfall. The electric motor M drives the electric oil pump EP. It may be understood that the electric oil pump EP includes the electric motor M.

The transmission TM further includes the hydraulic control circuit 1 and a transmission controller 2. The hydraulic control circuit 1 includes a plurality of flow paths and a plurality of hydraulic control valves, adjusts a pressure of oil supplied from the mechanical oil pump MP and the electric oil pump EP, and supplies the oil to each part of the transmission TM.

The transmission controller 2 serving as a hydraulic control device is a controller for controlling the transmission TM, and controls the hydraulic control circuit 1 and the electric motor M that drives the electric oil pump EP based on signals output from an ignition switch 27, various sensors 28 (specifically, including an accelerator position sensor, a rotational speed sensor, a vehicle speed sensor, and a hydraulic sensor), and the like. In the present embodiment, the transmission controller 2 is implemented by a CPU as a computer, but is not limited thereto, and may be implemented by a plurality of microcomputers, for example. The transmission controller 2 will be described in detail later.

The hydraulic control circuit 1 performs hydraulic control over the lock-up clutch LU, the forward clutch FWD/C, the reverse brake REV/B, the primary pulley PRI, the secondary pulley SEC, and the like based on a command from the transmission controller 2.

(Configuration of Hydraulic Control Circuit)

Next, the hydraulic control circuit 1 will be described with reference to FIG. 2.

Figure 2:
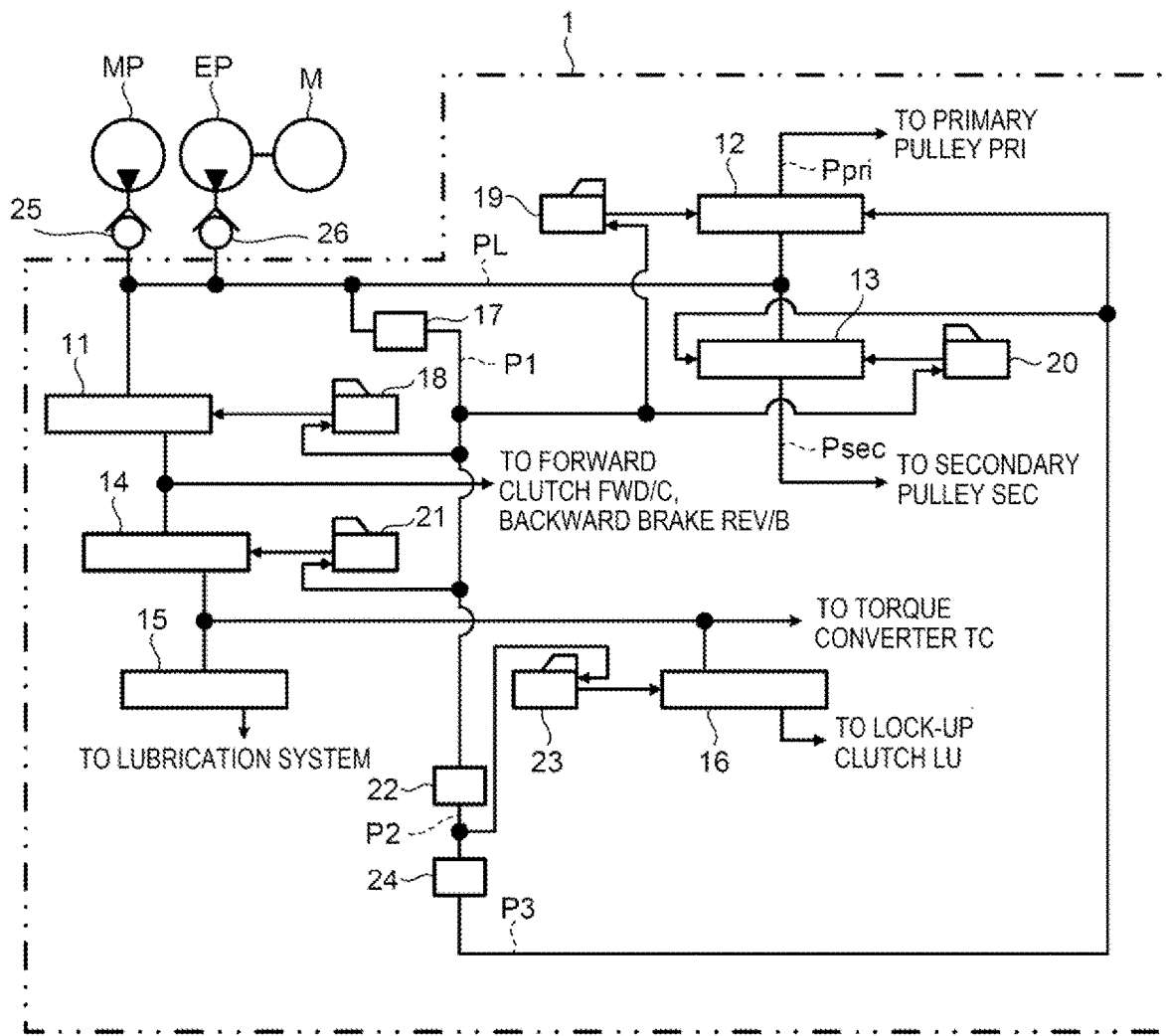
FIG. 2 is a schematic configuration diagram of a hydraulic control circuit.

FIG. 2 is a schematic configuration diagram of the hydraulic control circuit 1.

As shown in FIG. 2, the hydraulic control circuit 1 includes a pressure regulator valve 11, a primary regulator valve 12, a secondary regulator valve 13, a clutch regulator valve 14, a torque converter regulator valve 15, a lock-up regulator valve 16, a first pilot valve 17, a line pressure solenoid valve 18, a primary solenoid valve 19, a secondary solenoid valve 20, a clutch pressure solenoid valve 21, a second pilot valve 22, a lock-up solenoid valve 23, and a third pilot valve 24.

The pressure regulator valve 11 adjusts a pressure of oil discharged from at least one of the mechanical oil pump MP and the electric oil pump EP to a line pressure PL. A broken line indicating the line pressure PL indicates a hydraulic pressure, not an oil path. The pressure regulator valve 11 performs pressure adjustment while draining a part of the oil discharged from the oil pump. The oil adjusted to the line pressure PL is supplied to the primary regulator valve 12, the secondary regulator valve 13, and the first pilot valve 17.

The primary regulator valve 12 and the secondary regulator valve 13 are pulley pressure control valves, and control a pulley pressure by adjusting, to the pulley pressure, the oil adjusted to the line pressure PL. The pulley pressure is the primary pulley pressure Ppri in a case of the primary regulator valve 12, and is the secondary pulley pressure Psec in a case of the secondary regulator valve 13.

The oil drained from the pressure regulator valve 11 is supplied to the clutch regulator valve 14. The clutch regulator valve 14 adjusts a pressure of the oil drained from the pressure regulator valve 11 to a clutch pressure. The oil adjusted to the clutch pressure is selectively supplied to either the forward clutch FWD/C or the reverse brake REV/B. The clutch regulator valve 14 performs pressure adjustment while draining a part of the oil.

The oil drained from the clutch regulator valve 14 is supplied to the torque converter regulator valve 15. The torque converter regulator valve 15 adjusts the pressure of the oil drained from the pressure regulator valve 11 to a converter pressure of the torque converter TC. The torque converter regulator valve 15 performs pressure adjustment while draining a part of the oil, and the drained oil is supplied to a lubrication system in the transmission TM. The oil adjusted to the converter pressure is supplied to the torque converter TC and the lock-up regulator valve 16.

The lock-up regulator valve 16 adjusts the pressure of the oil adjusted to the converter pressure to a lock-up pressure. The lock-up clutch LU is subjected to lock-up control based on a lock-up differential pressure, which is a differential pressure between the converter pressure and the lock-up pressure. The oil adjusted to the lock-up pressure is supplied to the lock-up clutch LU.

The pressure regulator valve 11 performs pressure adjustment based on a signal pressure generated by the line pressure solenoid valve 18. The same applies to the primary regulator valve 12 and the primary solenoid valve 19, the secondary regulator valve 13 and the secondary solenoid valve 20, the clutch regulator valve 14 and the clutch pressure solenoid valve 21, and the lock-up regulator valve 16 and the lock-up solenoid valve 23.

A first pilot pressure P1 is introduced as a source pressure into each of the line pressure solenoid valve 18, the primary solenoid valve 19, the secondary solenoid valve 20, and the clutch pressure solenoid valve 21. The first pilot pressure P1 is generated by the first pilot valve 17 using the line pressure PL as a source pressure. The first pilot pressure P1 is also introduced to the second pilot valve 22.

The second pilot valve 22 generates a second pilot pressure P2 using the first pilot pressure P1 as a source pressure. The second pilot pressure P2 is set to be equal to or greater than a lower limit of a set range of the line pressure PL. The second pilot pressure P2 is set in advance in consideration of controllability of the lock-up clutch LU. The second pilot pressure P2 is introduced into the lock-up solenoid valve 23 and the third pilot valve 24.

The lock-up solenoid valve 23 generates a lock-up signal pressure using the second pilot pressure P2 as a source pressure. The lock-up signal pressure is a signal pressure generated by the lock-up solenoid valve 23 to control the lock-up pressure of the lock-up clutch LU of the torque converter TC.

The third pilot valve 24 generates a third pilot pressure P3 using the second pilot pressure P2 as a source pressure. The third pilot pressure P3 is set smaller than the lower limit of the set range of the line pressure PL. The third pilot pressure P3 is set in advance in consideration of damping performance of the primary regulator valve 12 and the secondary regulator valve 13. The third pilot pressure P3 is introduced as a damping pressure into the primary regulator valve 12 and the secondary regulator valve 13.

The third pilot pressure P3 introduced as the damping pressure is introduced to the primary regulator valve 12 so as to oppose a primary signal pressure. The primary signal pressure is a signal pressure generated by the primary solenoid valve 19 to control the primary pulley pressure Ppri.

Similarly, the third pilot pressure P3 introduced as the damping pressure is introduced to the secondary regulator valve 13 so as to oppose a secondary signal pressure. The secondary signal pressure is a signal pressure generated by the secondary solenoid valve 20 to control the secondary pulley pressure Psec.

(Configuration of Transmission Controller)

Next, the transmission controller 2 will be described with reference to FIG. 3.

Figure 3:
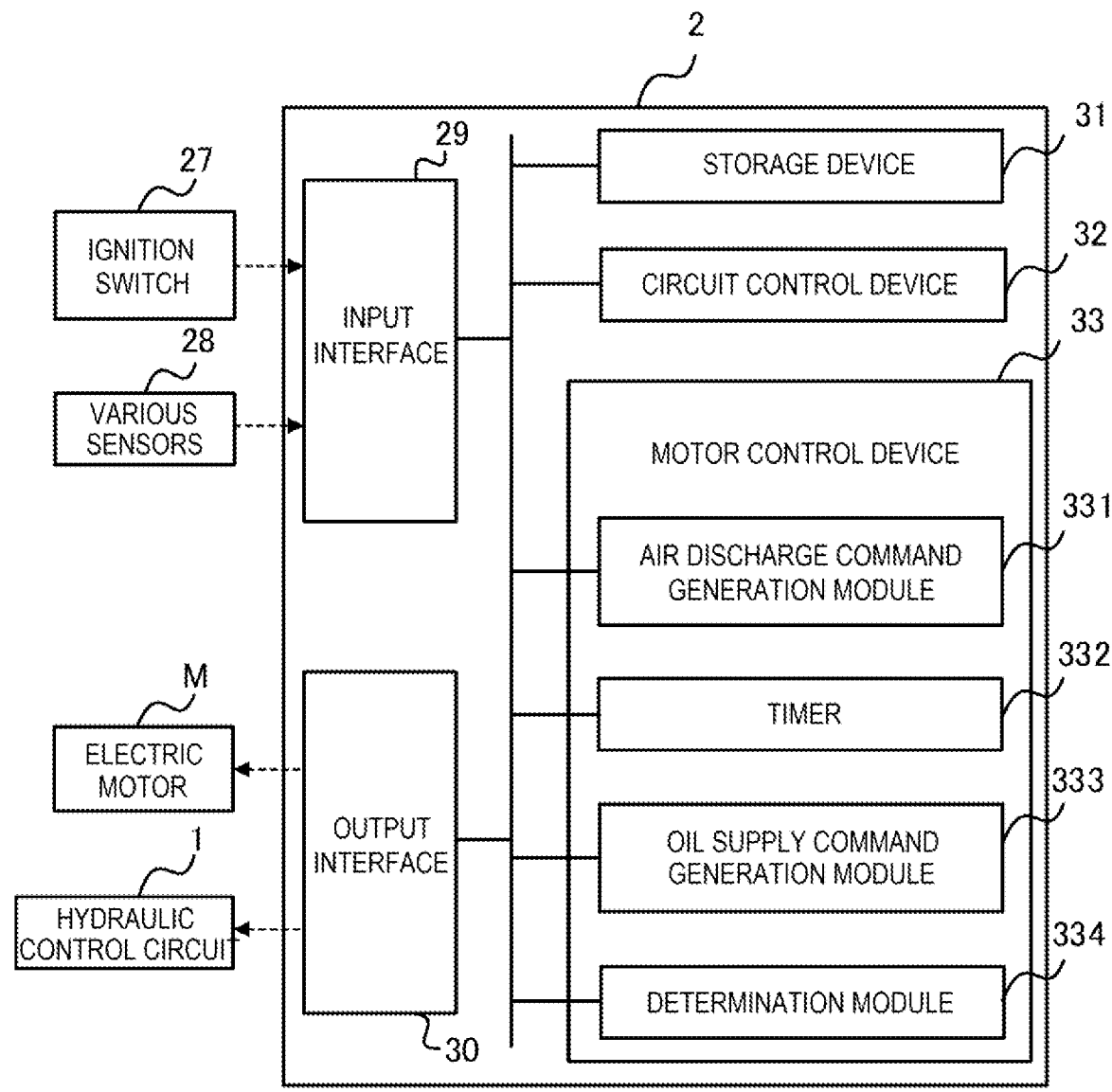
FIG. 3 is a configuration block diagram showing a transmission controller and main configurations connected to the transmission controller.

FIG. 3 is a configuration block diagram showing the transmission controller 2 and main configurations connected to the transmission controller 2.

As shown in FIG. 3, the transmission controller 2 includes an input interface 29, an output interface 30, a storage device 31, a hydraulic control circuit control device 32 (hereinafter, simply referred to as a circuit control device 32), and an electric motor control device 33 (hereinafter, simply referred to as a motor control device 33) that are electrically connected to each other.

The input interface 29 receives an output signal from the ignition switch 27 for switching between start and stop of the vehicle and output signals from the various sensors 28 that detect various parameters during traveling of the vehicle.

A circuit control command generated by a process of the circuit control device 32 and a motor control command generated by a process of the motor control device 33 are respectively output to the hydraulic control circuit 1 and the electric motor M via the output interface 30.

The storage device 31 is a memory that temporarily stores vehicle start and stop information included in the output signal from the ignition switch 27 and various parameters included in the output signals from the various sensors 28. In addition, the storage device 31 stores a process program and an algorithm program to be executed by the circuit control device 32 and the motor control device 33. In the present embodiment, the storage device 31 is built in the transmission controller 2, but is not limited to this, for example, may be provided separately from the transmission controller 2.

Further, the storage device 31 stores a predetermined time set in advance. The predetermined time is used for an air discharge process in the electric oil pump EP to be described later, and details thereof will be described later.

The circuit control device 32 generates a circuit control command based on the output signals output from the various sensors 28 and the like, and outputs the generated circuit control command to the hydraulic control circuit 1 via the output interface 30.

The motor control device 33 generates a motor control command based on the output signals output from the ignition switch 27, the various sensors 28, and the like, and outputs the generated motor control command to the electric motor M via the output interface 30.

In addition, the motor control device 33 includes an air discharge command generation module 331 as an air discharge command generation unit, a timer 332, an oil supply command generation module 333 as an oil supply command generation unit, and a determination module 334 as a determination unit. Details of the air discharge command generation module 331, the timer 332, the oil supply command generation module 333, and the determination module 334 will be described later in the air discharge process in the electric oil pump EP.

(Air Discharge Process in Electric Oil Pump)

Next, the air discharge process in the electric oil pump EP (a control process for the transmission TM) will be described with reference to FIG. 4.

Figure 4:
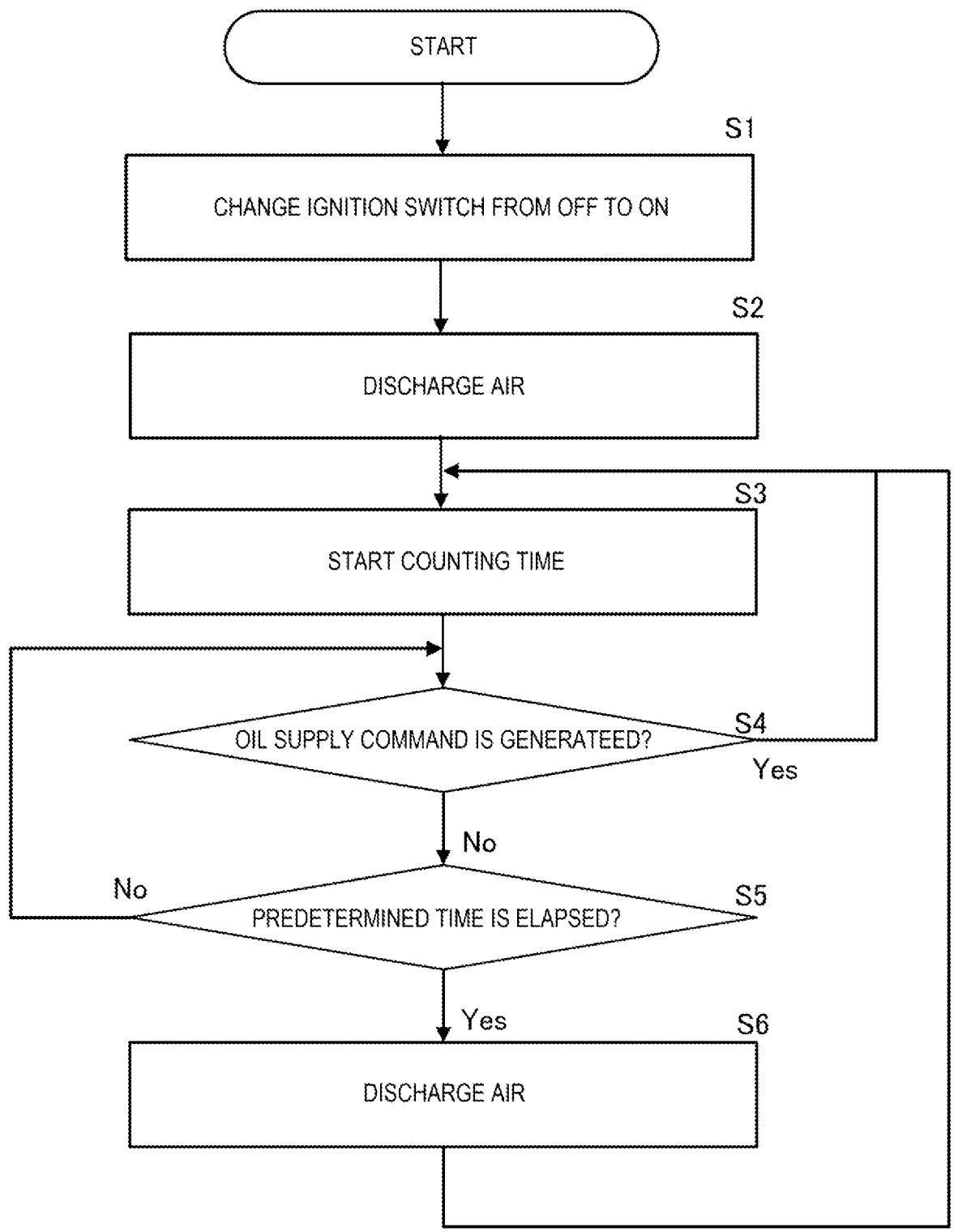
FIG. 4 is a flowchart showing an air discharge process in an electric oil pump.

FIG. 4 is a flowchart showing the air discharge process in the electric oil pump EP.

When the ignition switch 27 of the vehicle is changed from OFF to ON by a user, the air discharge process in the electric oil pump EP is started.

As shown in FIG. 4, first, in step S1, the output signal output from the ignition switch 27 (specifically, an output signal obtained after changing the ignition switch 27 from OFF to ON, hereinafter, simply referred to as an ON output signal) is inputted to the input interface 29 of the transmission controller 2. Then, the input interface 29 outputs the input ON output signal to the motor control device 33 (specifically, the air discharge command generation module 331), and the process proceeds to step S2.

Next, in step S2, in response to the ignition switch 27 being changed from OFF to ON, the electric motor M drives the electric oil pump EP to discharge air accumulated in the electric oil pump EP together with oil.

Specifically, in step S2, the motor control device 33 (specifically, the air discharge command generation module 331) generates an air discharge command based on the ON output signal output from the input interface 29. Then, the air discharge command generation module 331 outputs the generated air discharge command to the electric motor M via the output interface 30 and outputs the air discharge command to the timer 332. Then, the electric motor M drives the electric oil pump EP to discharge the air accumulated in the electric oil pump EP together with the oil based on the air discharge command output from the air discharge command generation module 331, and the process proceeds to step S3.

Accordingly, since the air accumulated in the electric oil pump EP while the vehicle is stopped can be discharged together with the oil, responsiveness of the electric oil pump EP during use can be ensured.

Next, in step S3, the timer 332 of the motor control device 33 starts counting an elapsed time based on the air discharge command output from the air discharge command generation module 331, and the process proceeds to step S4. Here, the "elapsed time" is an elapsed time elapsed from a time point when the electric oil pump EP is driven by the electric motor M.

Next, in step S4, the determination module 334 of the motor control device 33 determines whether the oil supply command generation module 333 of the motor control device 33 is generated an oil supply command based on presence or absence of a drive request from the vehicle.

Then, when the determination module 334 determines that the oil supply command is generated in response to the drive request from the vehicle (in a case of Yes), the process returns to step S3. That is, the timer 332 is reset based on the oil supply command output from the determination module 334, and starts counting the elapsed time again, and the process proceeds to step S4.

The electric motor M drives the electric oil pump EP to supply oil from the electric oil pump EP to the hydraulic control circuit 1 together with air based on the oil supply command output from the oil supply command generation module 333 via the output interface 30. Accordingly, since the air accumulated in the electric oil pump EP while the vehicle is traveling can be discharged without performing the air discharge process, it is not necessary to continue counting the elapsed time. Thus, the timer 332 is reset based on the oil supply command output from the determination module 334.

On the other hand, when the determination module 334 determines that the oil supply command is not generated (in a case of No), the process proceeds to step S5.

Next, in step S5, the determination module 334 determines whether the elapsed time has reached a predetermined time. When the determination module 334 determines that the elapsed time has reached the predetermined time (in the case of Yes), a time excess signal indicating that the elapsed time has reached the predetermined time is output to the air discharge command generation module 331, and the process proceeds to step S6. On the other hand, when it is determined that the elapsed time has not reached the predetermined time (in the case of No), the process returns to step S4.

Next, in step S6, the electric motor M drives the electric oil pump EP to discharge the air accumulated in the electric oil pump EP together with the oil.

Specifically, regardless of whether the oil supply command generation module 333 generates the oil supply command, the air discharge command generation module 331 generates the air discharge command based on the time excess signal output from the determination module 334. Then, the air discharge command generation module 331 outputs the generated air discharge command to the electric motor M via the output interface 30 and outputs the air discharge command to the timer 332.

Then, the electric motor M drives the electric oil pump EP to discharge the air accumulated in the electric oil pump EP together with the oil based on the air discharge command output from the air discharge command generation module 331, and the process returns to step S3.

Accordingly, since the air accumulated in the electric oil pump EP while the vehicle is traveling without using the electric oil pump EP can be appropriately discharged together with the oil, the responsiveness of the electric oil pump EP during use can be ensured. As a result, performance of the transmission TM including the electric oil pump EP can be improved.

On the other hand, the timer 332 is reset based on the air discharge command output from the air discharge command generation module 331, starts counting the elapsed time again, and the process proceeds to step S4.

The predetermined time is set to be shorter than an air accumulation time at which air is accumulated in an amount that deteriorates the responsiveness of the electric oil pump EP during use while the vehicle is traveling. Accordingly, since the electric oil pump EP can be driven by the electric motor M to discharge air before the responsiveness of the electric oil pump EP during use deteriorates, the responsiveness of the electric oil pump EP during use can be ensured.

Specifically, the predetermined time is set based on the amount of the air accumulated in the electric oil pump EP while the vehicle is traveling. Accordingly, a use frequency of the electric oil pump EP can be reduced, so that durability of the electric oil pump EP can be ensured.

Since it is difficult to monitor the amount of the air accumulated in the electric oil pump EP while the vehicle is traveling, it is necessary to estimate the amount of the air while the vehicle is traveling. Thus, the inventor has found causes (specifically, a first cause and a second cause) that air is accumulated in the electric oil pump EP while the vehicle is traveling. The first cause is that air is confined in the electric oil pump EP at a time point when the electric oil pump EP is changed from ON to OFF. The second cause is that air flows into the electric oil pump EP from the check valve 26 (see FIGS. 1 and 2) together with oil while the electric oil pump EP is maintained in the OFF state.

A first air amount confined in the electric oil pump EP at a time point when the electric oil pump EP is changed from ON to OFF is estimated based on related parameters including a vehicle speed, an oil temperature, and the like. Meanwhile, a second air amount flowing into the electric oil pump EP from the check valve 26 together with the oil while the electric oil pump EP is maintained in the OFF state is estimated based on a leakage amount from the check valve 26. Then, an estimated air amount obtained by adding the first air amount and the second air amount is used for setting the predetermined time.

Meanwhile, the air accumulation time is calculated based on an air bearing strength limit of the electric oil pump EP, a volume and an air content of the electric oil pump EP, the leakage amount from the check valve 26, the line pressure PL, the oil temperature, the vehicle speed, an engine rotation speed, and the like.

(Operation and Effect)

Next, main functions and effects in the present embodiment will be described.

(1) The transmission controller 2 (hydraulic control device) for the transmission TM (hydraulic actuation machine) according to the present embodiment is the transmission controller 2 (hydraulic control device) for the transmission TM (hydraulic actuation machine) including the mechanical oil pump MP (main oil pump) that supplies oil to the transmission TM (hydraulic actuation machine), the electric oil pump EP (sub oil pump) that temporarily supplies oil to the transmission TM (hydraulic actuation machine) based on a drive request so as to compensate for an oil shortfall when supply of oil from the mechanical oil pump MP (main oil pump) to the transmission TM (hydraulic actuation machine) is stopped or insufficient, and the electric motor M (drive unit) that drives the electric oil pump EP (sub oil pump), in which when an elapsed time elapsed from a time point when the electric oil pump EP (sub oil pump) is driven reaches a predetermined time, the transmission controller 2 (hydraulic control device) generates an air discharge command for discharging air accumulated in the electric oil pump EP (sub oil pump) and outputs the air discharge command to the electric motor M (drive unit), and the electric motor M (drive unit) drives the electric oil pump EP (sub oil pump) to discharge the air accumulated in the electric oil pump EP (sub oil pump) based on the output air discharge command.

(4) A hydraulic control method for the transmission TM (hydraulic actuation machine) according to the present embodiment is a hydraulic control method for the transmission TM (hydraulic actuation machine) including the mechanical oil pump MP (main oil pump) that supplies oil to the transmission TM (hydraulic actuation machine), the electric oil pump EP (sub oil pump) that temporarily supplies oil to the transmission TM (hydraulic actuation machine) based on a drive request so as to compensate for an oil shortfall when supply of oil from the mechanical oil pump MP (main oil pump) to the transmission TM (hydraulic actuation machine) is stopped or insufficient, and the electric motor M (drive unit) that drives the electric oil pump EP (sub oil pump), the hydraulic control method including: an elapsed time counting step of counting an elapsed time elapsed from a time point when the electric oil pump EP (sub oil pump) is driven; a command generation and outputting step of generating an air discharge command for discharging air accumulated in the electric oil pump EP (sub oil pump) and outputting the air discharge command to the electric motor M (drive unit) when the counted elapsed time reaches a predetermined time; and an air discharge step of driving the electric oil pump EP (sub oil pump) to discharge the air accumulated in the electric oil pump EP (sub oil pump) by the electric motor M (drive unit) based on the output air discharge command.

(5) A program according to the present embodiment is a program for causing a CPU (computer), which controls the transmission TM (hydraulic actuation machine) including the mechanical oil pump MP (main oil pump) that supplies oil to the transmission TM (hydraulic actuation machine), the electric oil pump EP (sub oil pump) that temporarily supplies oil to the transmission TM (hydraulic actuation machine) based on a drive request so as to compensate for an oil shortfall when supply of oil from the mechanical oil pump MP (main oil pump) to the transmission TM (hydraulic actuation machine) is stopped or insufficient, and the electric motor M (drive unit) that drives the electric oil pump EP (sub oil pump), to execute: an elapsed time counting procedure of counting an elapsed time elapsed from a time point when the electric oil pump EP (sub oil pump) is driven; a command generation and outputting procedure of generating an air discharge command for discharging air accumulated in the electric oil pump EP (sub oil pump) and outputting the air discharge command to the electric motor M (drive unit) when the counted elapsed time reaches a predetermined time; and an air discharge procedure of driving the electric oil pump EP (sub oil pump) to discharge the air accumulated in the electric oil pump EP (sub oil pump) by the electric motor M (drive unit) based on the output air discharge command.

According to these configurations, since the air accumulated in the electric oil pump EP can be appropriately discharged together with the oil, the responsiveness of the electric oil pump EP during use can be ensured. In addition, since the air accumulated in the electric oil pump EP is discharged using the electric motor M that drives the electric oil pump EP, it is not necessary to separately provide an air discharge mechanism for discharging air, and the entire transmission TM can be simplified.

(2) The hydraulic actuation machine is the transmission TM that is hydraulically actuated.

According to this configuration, the performance of the transmission TM controlled by the transmission controller 2 can be improved.

(3) The mechanical oil pump MP (main oil pump) is driven by the engine ENG, and the electric oil pump EP (sub oil pump) is driven by the electric motor M constituting the drive unit.

According to this configuration, a drive unit that drives the mechanical oil pump MP and a drive unit that drives the electric oil pump EP can be implemented by the engine ENG and the electric motor M, respectively.

(Modification)

In the embodiment described above, the hydraulic actuation machine is implemented by the transmission TM, but is not limited thereto, and may be implemented by a device other than the transmission TM, for example.

In the embodiment described above, the main oil pump and the sub oil pump are respectively implemented by the mechanical oil pump MP and the electric oil pump EP, but are not limited thereto, and may be implemented by two electric oil pumps EP, for example.

Although the embodiment of the present invention has been described above, the above embodiment merely exemplifies some of application examples of the present invention and does not intend to limit the technical scope of the present invention to the specific configurations of the above embodiment.

DESCRIPTION OF REFERENCE SIGNS 1 hydraulic control circuit
2 transmission controller (hydraulic control device)
27 ignition switch
32 circuit control device
33 motor control device
M electric motor (drive unit)
EP mechanical oil pump (main oil pump)
LU lock-up clutch
MP electric oil pump (sub oil pump)
TC torque converter The present application claims a priority of Japanese Patent Application No. 2021-003952 filed with the Japan Patent Office on Jan. 14, 2021, all the contents of which are hereby incorporated by reference.

The invention claimed is:

1. A hydraulic control device for a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and an electric motor configured to drive the sub oil pump, wherein
when an elapsed time elapsed from a time point when the sub oil pump is driven reaches a predetermined time, the hydraulic control device generates an air discharge command for discharging air accumulated in the sub oil pump and outputs the air discharge command to the electric motor, the electric motor drives the sub oil pump to discharge the air accumulated in the sub oil pump based on the output air discharge command, and the electric motor drives the sub oil pump based on the drive request to temporarily supply oil to the hydraulic actuation machine before the elapsed time reaches the predetermined time.

2. The hydraulic control device for a hydraulic actuation machine according to claim 1, wherein the hydraulic actuation machine is a transmission that is hydraulically actuated.

3. The hydraulic control device for a hydraulic actuation machine according to claim 2, wherein the main oil pump is driven by an engine.

4. A hydraulic control method for a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and an electric motor configured to drive the sub oil pump, the hydraulic control method comprising:

counting an elapsed time elapsed from a time point when the sub oil pump is driven;

generating an air discharge command for discharging air accumulated in the sub oil pump and outputting the air discharge command to the electric motor when the counted elapsed time reaches a predetermined time;

driving the sub oil pump to discharge the air accumulated in the sub oil pump by the electric motor based on the output air discharge command; and causing the electric motor to drive the sub oil pump based on the drive request to temporarily supply oil to the hydraulic actuation machine before the elapsed time reaches the predetermined time.

5. A non-transitory computer-readable medium storing a program for causing a computer, which controls a hydraulic actuation machine including a main oil pump configured to supply oil to the hydraulic actuation machine, a sub oil pump configured to temporarily supply oil to the hydraulic actuation machine based on a drive request so as to compensate for an oil shortfall when supply of oil from the main oil pump to the hydraulic actuation machine is stopped or insufficient, and an electric motor configured to drive the sub oil pump, to execute:

an elapsed time counting procedure of counting an elapsed time elapsed from a time point when the sub oil pump is driven;

a command generation and outputting procedure of generating an air discharge command for discharging air accumulated in the sub oil pump and outputting the air discharge command to the electric motor when the counted elapsed time reaches a predetermined time; and an air discharge procedure of driving the sub oil pump to discharge the air accumulated in the sub oil pump by the electric motor based on the output air discharge command.

* * * * *